United States Patent [19]

Oxford

[11] Patent Number: 5,158,594
[45] Date of Patent: Oct. 27, 1992

[54] GRANULATED NITROGEN-PHOSPHORUS-POTASSIUM-SULFUR FERTILIZER FROM WASTE GYPSUM SLURRY

[76] Inventor: Ronald E. Oxford, 16344 Pernecia, Greenwell Springs, La. 70739

[21] Appl. No.: 436,222

[22] Filed: Oct. 25, 1982

[51] Int. Cl.⁵ .......................... C05F 7/00; C05F 11/00
[52] U.S. Cl. ........................................... 71/25; 71/34; 71/36; 71/43; 71/51; 71/53
[58] Field of Search ............... 71/25, 34, 36, 43, 42, 71/51, 53

[56] References Cited

U.S. PATENT DOCUMENTS

| | | | |
|---|---|---|---|
| 1,122,183 | 12/1914 | Willson et al. | 71/36 |
| 1,761,400 | 6/1930 | Liljenroth | 71/25 |
| 2,913,329 | 11/1959 | Geiersherger | 71/43 |
| 3,475,153 | 10/1969 | Abbott et al. | |
| 3,595,610 | 7/1971 | Brinkman et al. | |
| 4,007,030 | 2/1977 | Schroeder et al. | 71/40 |
| 4,312,842 | 1/1982 | Wilson, Sr. et al. | 423/170 |
| 4,393,032 | 7/1983 | Drechset et al. | 423/320 |
| 4,462,972 | 7/1984 | Satterwhite | 423/320 |

FOREIGN PATENT DOCUMENTS

| | | |
|---|---|---|
| 2623094 | 12/1977 | Fed. Rep. of Germany . |
| 644757 | 10/1976 | U.S.S.R. . |
| 783294 | 2/1977 | U.S.S.R. . |
| 779365 | 12/1977 | U.S.S.R. . |
| 1131858 | 8/1980 | U.S.S.R. . |
| 735293 | 8/1955 | United Kingdom . |

*Primary Examiner*—Asok Pal
*Attorney, Agent, or Firm*—Wm. T. Hough

[57] ABSTRACT

Process for converting phospho-gypsum waste product from the wet process of manufacturing phosphoric acid from phosphate rock by ammoniating said product at a pH of 6.5 or less and adjusting the phosphorus and potassium values of said ammoniated product by addition of one or more sources of potassium and phosphorus.

13 Claims, 1 Drawing Sheet

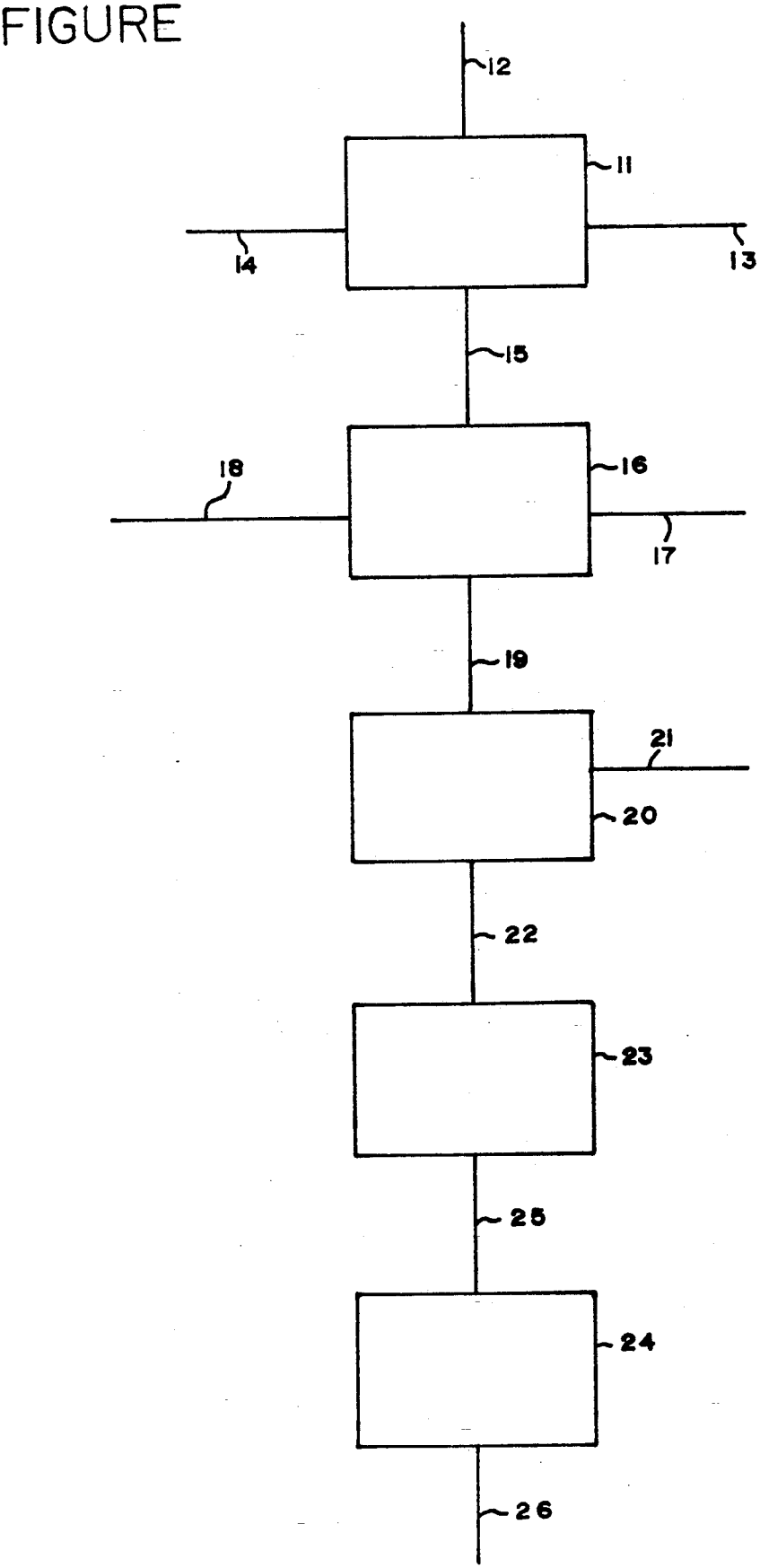
FIGURE

GRANULATED NITROGEN-PHOSPHORUS-POTASSIUM-SULFUR FERTILIZER FROM WASTE GYPSUM SLURRY

BACKGROUND OF THE INVENTION

1. Field of the Invention

This invention relates to a novel granulated nitrogen-phosphorus-potassium-sulfur fertilizer. More particularly, this invention relates to such fertilizer which is prepared from phospho-gypsum slurry by-product from the wet acid process of manufacturing phosphoric acid from phosphate rock or fluoroapatite.

2. Description of Prior Art

Natural phosphate rock, or fluorapatite, is the primary source of phosphoric acid. Two processes are in common use around the world to produce phosphoric acid. One process is the electric furnace process, and the other process is the acid, or wet, process.

The acid or wet process uses a strong mineral acid, usually sulfuric acid, to digest the rock, thereby releasing phosphoric acid. This digestion step also produces a residue of calcium sulfate, or phospho-gypsum, and small quantities of phosphorus, fluorine and various trace elements. This phospho-gypsum by-product, at present, has no commercial value and, in fact, poses an environmental problem because of the contamination of rainwater run-off by soluble compounds in the phospho-gypsum.

Prior to this invention, there have been many attempts to devise processes to recover all or part of the economically recoverable products contained in the waste phospho-gypsum and to concurrently solve the waste disposal problem. In Europe and other parts of the world, the phospho-gypsum is disposed of by dumping in the open sea. The readily apparent disadvantage of this method of disposal is that it results in loss of all commercial value. In other areas, notably the United States, the phospho-gypsum is disposed of by storage in a storage pile or impounding basin. The storage method of disposal also suffers from a number of inherent disadvantages. For example, the leaching action of rainwater and/or storage water produces an acidic effluent that may enter the nearby surface and/or groundwater regime, creating an environmental hazard. In recent years the practical impact of this disadvantage has become more acute in that increasingly stringent regulations require the collection of the effluent waters and neutralization. This collection and neutralization process is an expensive and nonproductive process.

The technical literature of the last 40 years or more includes discussions of and patents for various methods for the commercial use of all or part of the constituents of phospho-gypsum. In Japan, the United Kingdom, and several other countries, where natural gypsum is in short supply, the phospho-gypsum has been economically converted to plaster products, such as Plaster of Paris, to gypsum wallboard, or as an additive to portland cement, acting as a set retarder. This is not economically feasible in places such as North America where natural gypsum abounds.

Various proposals have been made for converting phospho-gypsum into useful and economical products by chemical means. In every instance, although technically feasible, the cost of the chemicals required to carry out the conversion has been greater than the value of the resulting product. An example is the reaction of gypsum with ammonia and carbon dioxide to form ammonium sulfate and calcium carbonate. Because of its low purity as compared to natural gypsum, the use of phospho-gypsum has not proven economical in this manner.

SUMMARY OF THE INVENTION

The conventional wet process of preparing phosphoric acid process produces an impure phospho-gypsum waste product that previously has had no commercial value and which is environmentally unacceptable. This invention provides a process whereby the heretofore uneconomical and environmental repugnant phospho-gypsum is converted into a useful granular fertilizer. Therefore, in accordance with this invention, there is provided a process for converting phospho-gypsum waste product, produced in the manufacture of phosphoric acid by the wet-acid process wherein the phosphate rock is treated with sulfuric or other mineral acids to produce the said phospho-gypsum waste product, into a granulated fertilizer, said process comprising the steps of:

ammoniating an aqueous mixture comprising the said phospho-gypsum waste product with an amount of ammonia sufficient to provide an ammoniated phospho-gypsum product having a nitrogen content of at least about 5 weight percent based on the total weight of the composition while maintaining the final pH of said mixture equal to or less than about 7 and adjusting the nitrogen-phosphorus-potassium values by addition to said ammoniated product of sources of phosphorous and potassium.

DESCRIPTION OF THE DRAWING

The accompanying drawing is a schematic diagram of the process for converting the phospho-gypsum by-product of the wet-acid process for manufacture of phosphoric acid into a valuable granulated fertilizer.

DETAILED DESCRIPTION OF THE PREFERRED EMBODIMENTS

The presently used wet-acid process for converting phosphate rock into phosphoric acid leaves a waste residue of impure phospho-gypsum which is uneconomical and is environmentally repugnant and hazardous. The improvements in the process, claimed in this invention, include complete utilization of the waste phospho-gypsum by conversion into a useful granulated fertilizer.

The improved process will work with phospho-gypsum waste product produced from all types of natural phosphate rock. A typical chemical analysis, for illustration, is that for a Florida Phosphate Rock of Commercial Grade 72 BPL. The rock will analyze about as follows:

| | |
|---|---|
| Calcium Phosphate, $Ca_3(PO_4)_2$ | 72% |
| Calcium Fluoride, $CaF_2$ | 8% |
| Calcium Carbonate, $CaCO_3$ | 6.5% |
| Calcium Sulfate, $CaSO_4$ | 2% |
| Silicon Dioxide, $SiO_2$ | 6.5% |
| Iron-Aluminum Oxides, $R_2O_3$ | 2% |
| Water, $H_2O$ | 1% |
| Organic Matter | 2% |

Production of phospho-gypsum for use in the process of this invention follows a fairly conventional sequence through the steps in this process, summarized as follows:

(1) Commercial phosphate rock is received at the phosphoric acid plant, and is charged to a grinder.

(2) The phosphate rock-acid slurry is passed into a digester tank where it reacts with sulfuric acid, diluted with water and dilute phosphoric acid or recycled waste phosphoric acid to produce a 55% strength phosphoric acid. The acid digestion usually requires 4 to 8 hours with constant agitation. The temperature is maintained at 75° to 80° C. to prevent partial dehydration of the gypsum that is formed. In some plants, a slightly higher temperature is used to form the calcium sulfate hemi-hydrate in a slightly more efficient process. The sulfuric acid for this step usually comes from an intra plant sulfuric acid plant. Water vapor and other gases evolved in the digester are taken to an absorber where the fluorine values are removed and stored. The product in the digester is now phosphoric acid and impure phospho-gypsum.

(3) The phosphoric acid-gypsum slurry is passed through a filtration device, usually a vacuum filter, where most of the impure phosphoric acid is removed, leaving a phospho-gypsum residue, which exists as fine crystalline particles or in the form of an aqueous slurry. The phospho-gypsum residue may be further treated to recover additional phosphoric acid values adhering to the particles or dissolved in the aqueous slurry.

(4) Dissolved in the phosphoric acid filtrate are some iron, aluminum, calcium, and other metal compounds. Most of these compounds may be separated from the phosphoric acid as a sludge by precipitation and filtration.

(5) The phosphoric acid also contains a small amount of radioactive uranium. Several patented and/or proprietary processes exist for recovery of uranium values from phosphoric acid, usually by the "yellow cake" method. This part of the process is not claimed in this invention; however, our process does not preclude its use.

(6) The phosphoric acid filtrate is evaporated to the desired concentration and used, in another process, or stored and sold. Fumes from the evaporators usually contain fluorine and phosphorus and these are recovered by conventional methods.

The above-referenced procedure is merely a schematic description of a conventional wet-acid process, by which the phospho-gypsum residue is produced and is not claimed as a part of this invention. The improved process of this invention involves the conversion of the phosphogypsum residue from step (3) above into a useful granulated fertilizer and can be more readily understood from the attached FIGURE. As shown in the figure, phosphogypsum or an aqueous slurry of same is fed into a preneutralizer 11 by way of line 12. In general, the amount of phosphogypsum employed is such that the amount of sulfur in the final product is at least about 0.5 weight percent. In the preferred embodiments of the invention, the amount of phosphogypsum employed is such that the amount of sulfur is between about 2 and 20 weight percent based on the total weight of the mixture, and in the particularly preferred embodiments, the amount of phosphogypsum employed is such that the amount of sulfur is between about 12 and about 18 weight percent. During this period, the phosphorous content of the mixture can be determined; and if it is below that desired in the final product, additional phosphorous can be added to preneutralizer 11 usually in the form of phosphoric acid by way of feed line 14. Usually, the phosphorus content in the final product is up to about 40 weight percent (expressed as $P_2O_5$ by weight). In the preferred embodiments of the invention, the weight percent phosphorus in the final product is from about 5 and about 30 and in the particularly preferred embodiments, is from about 5 to about 25. Ammonia, either in the form of an aqueous solution, or preferably in the anhydrous form, is fed into preneutralizer 11 with stirring. The amount of ammonia introduced is not critical and depends on the percent nitrogen desired in the final product. Usually, the amount of ammonia introduced is sufficient to provide a granulated fertilizer containing up to about thirty-five weight percent nitrogen, and usually with a slight excess to compensate for losses, is added to achieve the desired result.

In the preferred embodiments of this invention, the amount of ammonia added should be sufficient to provide a granulated having a nitrogen content of between about 5 and about 35 weight percent and in the particularly preferred embodiments, the amount of ammonia should be sufficient to provide a product having a nitrogen content between about 5 and about 30 weight percent. Most preferred are those embodiments in which the weight percent nitrogen is between about 25 weight percent. The solubility of ammonia in the aqueous phospho-gypsum slurry is pH dependent, and an amount of sulfuric acid is fed into preneutralizer 11 by way of line 13 which is sufficient to maintain the final pH of the aqueous mixture at about 7 or below. In the preferred embodiments of the invention, an amount of sulfuric acid is introduced which is sufficient to maintain pH to at or below about 3, and in the most preferred embodiments, an amount of acid is added which is sufficient to maintain the pH at or below about 2. The mixture is maintained in preneutralizer 11 for a time sufficient to allow the ammonia to react. After the reaction has gone to completion, the reaction mixture is fed by way of line 15 to granulator 16. Granulator 16 is a rotary drum which causes the small particles to agglomerate into pellets or granules of the desired size. The size of the granules are not critical and will depend entirely on the desires of the manufacturer. For example, the granules can have a particle size on the order of from about 50 to about 100 microns or smaller to about 3,000 to about 4,000 microns or even larger. In granulator 16 most of the remaining water in the mixture is driven off as steam by the heat of reaction through steam outlet 17. Additional sulfuric acid can be added to granulator 16 for pH adjustments if gaseous ammonia evaluation is observed. While the mixture is in granulator 16, the desired amount of potassium in the form of a neutral or acidic potassium salt such as potassium byphosphate, potassium phosphate, potassium chloride, potassium sulfate, potassium bisulfate, potassium thiosulfate, potassium nitrate, potassium carbonate, potassium bicarbonate and the like, preferable as potassium chloride, is introduced in granulator 16 in combination with recycled product by way of feed line 18. If the use of basic potassium salts such as potassium hydroxide is contemplated, such basic salts should be added to the mixture during the preneutralization step. Usually, the potassium content of the fertilizer of this invention is up to about 40 weight percent, expressed as $K_2O$. In the preferred embodiments of the invention, the weight percent potassium is in the range of from about 5 to about 30, and in the particularly preferred embodiments is in the range of from about 5 to about 25. After the product is sufficiently granulated, it is in the form of a damp solid which is fed by way of line 19 to dryer 20 where substantially all of the water remaining in the product is driven off via line 21. The granulated product is then conveyed via line 22 to screens 23 where granular pellets of the desired size are selected and conveyed to cooler 24 via line 25 where the product is cooled to room temperature and thereafter conveyed to storage via line 26. Granular pellets which are either too large or too small are conveyed to granulator 16 via line 18 for proper sizing.

The granular fertilizer composition of this invention can be used as a fertilizer in accordance with methods known to those of skill in the art. They can be added to the foliage of plants in the form of aqueous suspensions or they can be added to the soil around plants in an amount sufficient to improve plant growth and crop yields. Normally, the granular fertilizer can be applied to plants in an amount from about 25 lbs per acre up to about 1,500 lbs per acre and preferably, in an amount of from about 100 to about 1,000 lbs. per acre. With respect to plants, they have a high margin of safety in that when used in amounts sufficient to increase yields, they do not burn or injure the foliage or roots of plants and do not injure seeds. They are resistant to weathering, decomposition by ultraviolet light, oxidation, hydrolysis or the like at least to the extent that such decomposition, oxidation or hydrolysis would impart undesireable characteristics to the composition. The fertilizer compositions of this invention are so chemically inert that they are compatible with substantially any other substance, as for example, other fertilizer, pesticides, plant growth regulators and the like, which are added to plants to increase yields.

The following specific examples are provided to more particularly illustrate the process of this invention.

EXAMPLE I

A slurry of 500 gms of phospho-gypsum and 500 gms water containing about 2% of $H_2PO_4$ (expressed as $P_2O_5$) and 2.41% fluoride (expressed as F) was mixed and ammoniated to a pH of 8.0 with 30% $NH_4OH$. The ammoniated slurry was then filtered through #4 Whatman Filter Paper and the solid and liquid phases were collected. The solid phase (ammoniated gypsum) was then reslurried with 35% recycle phosphorus acid, and then mixed with 60 gms of 45% KOH. The slurry was then ammoniated with $NH_4OH$ to a pH of 6.1. During ammoniation 5 mls of 98% $H_2SO_4$ was added intermittently to maintain the pH of the slurry below 7.0. The slurry was then evaporated to near dryness and put on a #6 sieve and granulated on a sieve shaker.

Analysis of the granulated product are set forth in Table I as follows:

TABLE I

| | | |
|---|---|---|
| $N_2$ | = | 7.20% |
| $P_2O_5$ | = | 12.05% |
| $K_2O$ | = | 8.09% |
| MgO | = | .22% |
| $Fe_2O_3$ | = | .23% |
| CaO | = | 27.81% |
| $SO_4$ | = | 34.97% |
| $F_2$ | = | 2.03% |
| $H_2O$ | = | 5.34% |
| $SO_4$ as S | = | 11.67% |

The product can be applied to soybean at a rate of 150 lbs. per acre to increase crop yield.

EXAMPLE II

Utilizing the procedure of EXAMPLE I, the following reactants:

| | |
|---|---|
| 1000 gms | phospho-gypsum |
| 1000 gms | Water containing $H_3PO_4$ (2% phosphorus expressed as $P_2O_5$) |
| 158 gms | 50% $H_3PO_4$ |
| 130 gms | 50% KOH |
| 250 gms | 30% $NH_4OH$ |
| 8 mls | 98% $H_2SO_4$ | were reacted to provide a product having the following characteristics:

| Analysis: | | | |
|---|---|---|---|
| Total | $NH_3/N_2$ | = | 5.00% |
| | $P_2O_5$ | = | 9.18% |
| | $K_2O$ | = | 10.55% |
| | MgO | = | .14% |
| | $Fe_2O_3$ | = | 1.72% |
| | CaO | = | 22.85% |
| | $SO_4$ | = | 44.97% |
| | $SO_4$ as S | = | 15.01% |
| | $F_2$ | = | 1.57% |
| Soluble | $NH_3/NH_2$ | = | 5.00% |
| | $P_2O_5$ | = | 8.46% |
| | $K_2O$ | = | — |
| | MgO | = | .13% |
| | $Fe_2O_3$ | = | 1.36% |
| | CaO | = | 22.06% |

The product can be applied to corn at a rate of 200 lbs. per acre to increase yield.

EXAMPLE III

Utilizing the procedure of EXAMPLE I, the following reactants:

| | |
|---|---|
| 454 gms | phospho-gypsum |
| 454 gms | Water containing $H_3PO_4$ (2% phosphorus expressed as $P_2O_5$) |
| 50 gms | 50% $H_3PO_4$ |
| 50 gms | 50% KOH |
| 112 gms | 30% $NH_4OH$ |
| 5 mls | 98% $H_2SO_4$ | were reacted to provide a product having the following characteristic:

| Analysis: | | | |
|---|---|---|---|
| Total | $NH_3/N_2$ | = | 3.81% |
| | $P_2O_5$ | = | 6.29% |
| | $K_2O$ | = | 5.44% |
| | MgO | = | .13% |
| | CaO | = | 27.19% |
| | $Fe_2O_3$ | = | .95% |
| | $SO_4$ | = | 47.39% |
| | $SO_4$ as S | = | 15.82% |
| Soluble | $NH_3/NH_2$ | = | 3.72% |
| | $P_2O_5$ | = | 6.29% |
| | $K_2O$ | = | — |
| | MgO | = | .13% |
| | CaO | = | 17.20% |
| | $Fe_2O_3$ | = | Nil |

The product can be applied to lima bean at a rate of 500 lbs. per acre to increase plant yield.

EXAMPLE IV

Utilizing the procedure of Example I, the following reactants:

| | |
|---|---|
| 2000 gms | phospho-gypsum |
| 2000 gms | Water containing $H_3PO_4$ (2% phosphorus expressed as $P_2O_5$) |
| 350 gms, | 50% $H_3PO_4$ |
| 425 gms, | 45% KOH |
| 494 gms | $NH_3$ (Heated $NH_4OH$ to Liberate $NH_3$) |
| 50 mls. | 98% $H_2SO_4$ | were reacted to provide a product having the following characteristics:

| Analysis: | | | |
|---|---|---|---|
| Total | $NH_3/N_2$ | = | 2.89% |
| | $P_2O_5$ | = | 9.06% |
| | $K_2O$ | = | 7.94% |
| | MgO | = | .14% |
| | CaO | = | 27.70% |
| | $Fe_2O_3$ | = | 1.55% |
| | $SO_4$ | = | 45.35% |
| | $SO_4$ as S | = | 15.14% |
| Soluble | $NH_3/N_2$ | = | 2.51% |
| | $P_2O_5$ | = | 8.78% |
| | $K_2O$ | = | — |
| | MgO | = | .13% |
| | CaO | = | 17.46% |
| | $Fe_2O_3$ | = | Nil |

The product can be applied to spinach at a rate of 700 lbs. to increase yield.

EXAMPLE V

Utilizing the procedure of Example I, the following reactants:

| | |
|---|---|
| 625 gms. | Ammoniated phospho-gypsum |
| 250 gms | 35% $H_3PO_4$ (12.14% $P_2O_5$) |
| 103 gms | 45% KOH |
| 96 gms | $NH_3$ (197 gms $NH_4OH$ heated to liberate $NH_3$) |
| 22 mls | 98% $H_2SO_4$ | were reacted to provide a product having the following characteristics:

| Analysis: | | | |
|---|---|---|---|
| Total | $N_2$ | = | 5.58% |
| | $P_2O_5$ | = | 9.90% |
| | $K_2O$ | = | 8.31 |
| | MgO | = | .32% |
| | CaO | = | 25.34% |
| | $Fe_2O_3$ | = | .27% |
| | $SO_4$ | = | 41.99% |
| | $SO_4$ as S | = | 14.01% |
| | $F_2$ | = | 3.06% |
| Soluble | $N_2$ | = | 5.45% |
| | $P_2O_5$ | = | 9.84% |
| | $K_2O$ | = | — |
| | MgO | = | .31% |
| | CaO | = | 24.86% |
| | $Fe_2O_3$ | = | .25% |
| | $SO_4$ | = | 39.02% |
| | $SO_4$ as S | = | 13.01% |

The product can be applied to corn at the rate of 600 lbs. per acre to increase yield.

EXAMPLE VII

A slurry of 500 gms gypsum and 500 gms water containing 2% $H_3PO_4$ (expressed as $P_2O_5$) were mixed and ammoniated with $NH_3$ to a pH of 9.5. The ammoniated product contained 1.85% to $P_2O_5$ and 1.52% N. To the product was added 75 mls of 49% phosphoric acid. The pH dropped to 2.0. The slurry was again ammoniated to a pH of 4.85 and contained 8.09% $P_2O_5$ and 3.72% N. To the slurry was then added 60 mls 48% KOH to provide a mixture having a pH of 9. The pH of the mixture was then adjusted to 5.0 by addition of sulfuric acid. The slurry was then evaporated to near dryness, put on a #6 sieve and granulated to dryness on a sieve shaker. The product had the following characteristics:

| Analysis of the dryed product was as follows: | | | |
|---|---|---|---|
| | CaO | = | 27.5% Wt. |
| | N | = | 7.0% Wt. |
| | $P_2O_5$ | = | 12.6% Wt. |
| | $K_2O$ | = | 9.1% Wt. |
| | MgO | = | 0.23% Wt. |
| | F | = | 1.65% Wt. |
| | $SO_4$ as S | = | 14.7% Wt. |
| | $Al_2O_3$ | = | 0.61% Wt. |
| | $Fe_2O_3$ | = | 1.60% Wt. |

The product can be applied to soybean at the rate of 600 lbs. per acre to increase yield.

What is claimed is:

1. A process for converting phospho-gypsum waste by-product, produced in the manufacture of phosphoric acid by the wet-acid process in which phosphate rock is treated with sulfuric acid to produce said phospho-gypsum waste product, into a granulated fertilizer, said process comprising the steps of:
   (a) forming an aqueous slurry comprising said phosphogypsym waste product;
   (b) ammoniating said phospho-gypsum waste product;
   (c) adding at-least one source of phosphorus and potassium in an amount sufficient to adjust nitrogen-phosphorus-sulfur potassium values of said ammoniated product and to form an adjusted slurry, so that the final product will be useful as a granular fertilizer; and
   (d) adjusting pH of said adjusted-slurry to a pH up to about pH 7.

2. A process according to claim 1 which further comprises adjusting the sulfur value of said aqueous slurry by addition of one or more sources of sulfur.

3. A process according to claim 1 which further comprises separating the liquid and solid phases of said slurry.

4. A process according to claim 1 wherein the amount of ammonia added to said slurry is sufficient to provide an ammoniated phospho-gypsum product having a nitrogen content of at least about 5 weight percent (expressed as % N) based on the total weight of the product.

5. A process according to claim 4 wherein said weight percent is between about 5 and about 35.

6. A process according to claim 5 wherein said weight percent is between about 5 and about 30.

7. A process according to claim 1 wherein said pH during said ammoniation step is equal to or below about 3.

8. A process according to claim 7 wherein said pH is equal to or below about 2.

9. A process according to claim 1 wherein the amount of one or more sources of phosphorus is sufficient to provide a product wherein the weight percent phosphorus expressed as $P_2O_5$ is from about 5 to about 30.

10. A process according to claim 9 wherein said weight percent phosphorus is from about 5 to about 25.

11. A process according to claim 1 wherein the amount of one or more sources of potassium is sufficient to provide a product wherein the weight percent potassium is from about 5 to about 30.

12. A process according to claim 11 wherein said weight percent potassium is from about 5 to about 25.

13. A process according to claim 1 wherein said product is ammoniated by addition of aqueous ammonium hydroxide.

* * * * *